United States Patent Office 3,476,793
Patented Nov. 4, 1969

3,476,793
PRODUCTION OF ADIPONITRILE
Karl Adam, Alfred Schulz, Erich Haarer, and Siegfried Winderl, Ludwigshafen (Rhine), Germany, assignors to Badische Anilin- & Soda-Fabrik Aktiengesellschaft, Ludwigshafen (Rhine), Germany
No Drawing. Filed Sept. 15, 1966, Ser. No. 579,485
Claims priority, application Germany, Sept. 22, 1965, B 83,838
Int. Cl. C07c *121/20, 121/02, 121/28*
U.S. Cl. 260—465.8                                6 Claims

ABSTRACT OF THE DISCLOSURE

Production of adiponitrile by liquid phase hydrogenation of 1,4-dicyanobutene at 50 to 200° C. and 50 to 200 atmospheres using a palladium-silver catalyst which may also contain cobalt, nickel, manganese and/or vanadium oxide and/or promoters.

This invention relates to the production of adiponitrile and more specifically to the hydrogenation of 1,4-dicyanobutenes to form adiponitrile.

It is known that dihydromucononitrile (1,4-dicyano-2-butene) may be hydrogenated in contact with palladium supported catalysts to form adiponitrile. In this method good yields are achieved but the life of these catalysts is short.

It is an object of the invention to provide a process for the production of adiponitrile by hydrogenation of 1,4-dicyano-2-butene according to which a long life of the catalysts used is achieved. It is another object of the invention to provide catalysts for the hydrogenation of 1,4-dicyano-2-butene which give a high yield of adiponitrile per gram of catalyst. It is a further object of the invention to provide catalysts for the hydrogenation of 1,4-dicyano-2-butene which have a long life. These and other objects and advantages will be better understood from the following detailed description.

We have now found that in the continuous production of adiponitrile by hydrogenation of 1,4-dicyanobutenes in the liquid phase at a temperature of 50° to 200° C. using at least 1 mole of hydrogen per mole of 1,4-dicyanobutene and using a palladium supported catalyst, a substantially longer catalyst life than when using prior art catalysts is achieved by using a catalyst containing palladium and silver, with or without the addition of nickel and/or cobalt in the form of the oxides or the metals, advantageously on a siliceous carrier heated to a high temperature.

1,4-dicyano-1-butene or 1,4-dicyano-2-butene or mixtures of these compounds may be used as starting materials. Hydrogen is generally used in at least twice the amount required stoichiometrically, although the process may be carried out with any amount of hydrogen which reaches or exceeds the amount stoichiometrically necessary. Even excesses of 25 to 50 moles of hydrogen do not effect any further hydrogenation of the nitrile groups to amino groups.

The most favorable reaction temperatures depend partly on the other reaction conditions. In general it is advisable to use temperatures of 50° to 170° C., particularly from 75° to 150° C.

Hydrogenation is in general carried out at superatmospheric pressure, particularly 50 to 300 atmospheres gauge. The process may however also be carried out at atmospheric pressure.

Although the 1,4-dicyanobutenes may be hydrogenated in molten form, hydrogenation of the 1,4-dicyanobutenes is generally carried out in solution in an inert solvent, most simply, from the point of view of processing, in the end product (adiponitrile). Other nitriles of lower saturated carboxylic acids, for example acetonitrile or propionitrile, may however also be used. Unsubstituted or alkyl-substituted aromatic hydrocarbons, particularly those having six to eight carbon atoms, saturated aliphatic or cycloaliphatic hydrocarbons, particularly those having five to twelve carbon atoms, for example benzene, toluene, xylene, cyclohexane, cyclooctane, hexane, heptane or octane are also suitable. Lower aliphatic alcohols, such as methanol, ethanol, propanol or isopropanol may however also be used. When adiponitrile is chosen as the solvent, it is sufficient to use a reaction product containing adiponitrile such as is obtained in the hydrogenation of 1,4-dicyanobutenes. It is preferred to hydrogenate solutions having a content of 3 to 50%, particularly 3 to 20%, by weight of 1,4-dicyanobutenes.

Unsupported catalysts or those supported particularly on silicate carriers may be used. Palladium is used in an amount of 1 to 30% by weight, advantageously 3 to 15% by weight, on silver. Palladium may be partly replaced, for example up to 70% by weight of the maximum amount of palladium present, by nickel and/or cobalt or, in other words, nickel and/or cobalt may be present in an amount of up to 233% by weight of the palladium present. Nickel and/or cobalt may be contained in the catalyst in an amount of 3 to 25 times the weight of palladium in the catalyst. The catalyst may be improved in its activity by adding 1 to 50% by weight, particularly 5 to 25% by weight, of manganese and/or vanadium oxide with the reference to the silver.

When a carrier is used for the active ingredients of the catalyst, it is best to use a siliceous carrier, particularly silicic acid. Synthetic or natural silicates, such as bleaching earth, fullers earth, synthetic aluminum, zinc or magnesium silicates. It is advantageous to heat these carriers to a temperature of at least 900° C., advantageously 1,000° to 1,300° C., prior to their impregnation with the active ingredients so that they can only absorb a small amount of water. Aluminum oxide which has been heated to a high temperature may also be used as carrier. For example a suitable catalyst may be prepared by impregnatnig the carrier with a salt solution of the catalytically active metals and then converting them into the oxides by heating in a current of air or oxygen, advantageously at temperatures of 300° to 700° C., particularly at 400° to 600° C. It is advantageous to carry out the heating of the carrier to the temperature of more than 900° C. prior to the impregnation.

Examples of silver salts which may be used are the carbonate, nitrate or acetate. Palladium may be used for example in the form of a palladium nitrate solution containing nitric acid. The additions of cobalt, nickel, manganese and/or vanadium (when used) are added in the form of appropriate salts, for example nitrates, acetates, oxalates, sulfates or as ammonium vanadate or sodium vanadate. When using supported catalysts, 2 to 25% by weight, particularly 3 to 15% by weight (calculated as oxides on the total catalyst) of active ingredients are applied.

The oxidic catalysts may be wholly or partly reduced prior to use.

The catalyst may be used for example in the form of spheres, pellets or extruded pieces.

The activity of the catalyst may be improved by adding small amounts of promoters, for example compounds of main groups 1 to 3 and/or 6 of the Periodic System, for example sodium, potassium, calcium, aluminum, chromium, molybdenum, for example in an amount of 1 to 70% on palladium. The catalysts can be regenerated within a few hours by air oxidation at temperatures of 120° to 350° C. or more.

The invention is illustrated by the following Examples in which the percentages are by weight.

EXAMPLE 1

500 ccm. of a catalyst composed of 0.3% of palladium, 5% of silver and 1% of manganese on hardened silicic acid pellets is placed in a vertical tube having an internal diameter of 24 mm. and a height of 1,500 mm. 30 g. of a mixture of 1,4-dicyanobutene-(1) and 1,4-dicyanobutene-(2) in a ratio of 1:1 is injected per hour with a metering pump at a temperature of 120° C. and a pressure of 300 atmospheres gauge. At the same time 100 liters of hydrogen per hour is passed through the reactor. The product obtained by hydrogenation is determined by gas chromatography. It consists of more than 98% of adiponitrile, the remainder being starting material. The melting point of the product is 0° C. The catalyst retains undiminished activity for more than 5,400 hours.

EXAMPLE 2

500 ccm. of a catalyst composed of 0.3% of palladium and 5% of silver on hardened silicic acid pellets is placed in a vertical tube having an internal diameter of 24 mm. and a height of 1,500 mm. 50 g. of a mixture of 1,4-dicyanobutene-(1) and 1,4-dicyanobutene-(2) in a ratio of 1:1 is injected hourly with a metering pump at a temperature of 120° C. and a pressure of 300 atmospheres gauge. At the same time 200 liters of hydrogen per hour is passed through the reactor. The product obtained by hydrogenation is determined by gas chromatography. It consists of more than 97% of adiponitrile the remainder being starting product. The melting point of the crude adiponitrile is 0° C.

EXAMPLE 3

500 ccm. of a catalyst composed of 10% of nickel, 5% of silver, 0.1% of palladium and 1% of manganese on hardened silicic acid pellets is placed in a vertical tube having an internal diameter of 24 mm. and a height of 1,500 mm. 30 g. of a mixture of 1,4-dicyanobutene-(1) and 1,4-dicyanobutene-(2) in a ratio of 1:1 is injected hourly with a metering pump at a temperature of 120° C. and a pressure of 300 atmospheres gauge. At the same time 100 liters of hydrogen per hour is passed through the reactor. The product obtained by hydrogenation is determined by gas chromatography. It consists of more than 96.5% of adiponitrile, the remainder being starting material. The melting point of the crude adiponitrile is 0° C.

We claim:

1. A process for the continuous production of adiponitrile which comprises passing 1,4-dicyanobutenes in liquid phase in the presence of at least one mole of hydrogen per mole of 1,4-dicyanobutene at a temperature of 50° to 200° C. and a pressure of 50 to 300 atmospheres gauge over a catalyst consisting essentially of palladium and silver in which palladium is present in an amount of 1 to 30% by weight with reference to silver.

2. A process as claimed in claim 1 wherein the components of said catalyst are supported on an inert carrier in a quantitative amount providing 2–25% by weight of the active catalytic components, calculated as oxides, with reference to the total catalyst.

3. A process for the continuous production of adiponitrile which comprises passing 1,4-dicyanobutenes in liquid phase in the presence of at least one mole of hydrogen per mole of 1,4-dicyanobutene at a temperature of 50° to 200° C. and a pressure of 50 to 300 atmospheres gauge over a catalyst consisting essentially of palladium, silver and cobalt and/or nickel, the palladium being present in an amount of 1 to 30% by weight with reference to silver and the nickel and/or cobalt being present in an amount of 3 to 25 times the weight of the palladium in the catalyst.

4. A process as claimed in claim 3 wherein the components of said catalyst are supported on an inert carrier in a quantitative amount providing 2–25% by weight of the active catalytic components, calculated as oxides, with reference to the total catalyst.

5. A process for the continuous production of adiponitrile which comprises passing 1,4-dicyanobutenes in liquid phase in the presence of at least one mole of hydrogen per mole of 1,4-dicyanobutene at a temperature of 50° to 200° C. and a pressure of 50 to 300 atmospheres gauge over a catalyst consisting essentially of palladium, silver, 0–233% by weight with reference to the palladium of cobalt and/or nickel, and manganese and/or vanadium oxide, the palladium being present in an amount of 1 to 30% by weight with reference to silver, and the manganese and/or vanadium oxide being present in an amount of 1–50% by weight with reference to silver.

6. A process as claimed in claim 5 wherein the components of said catalyst are supported on an inert carrier in a quantitative amount providing 2–25% by weight of the active catalytic components, calculated as oxides, with reference to the total catalyst.

References Cited

UNITED STATES PATENTS 2,451,386   10/1948   Hager _____ 260—465.8
2,749,359   6/1956    Calkins et al. _____ 260—465.8

JOSEPH P. BRUST, Primary Examiner